United States Patent [19]

Payton et al.

[11] Patent Number: 5,248,515
[45] Date of Patent: Sep. 28, 1993

[54] PROCESSING METHOD USING ENTIRE PEELED VEGETABLE IN A FRUIT JUICE/VEGETABLE PUREE BEVERAGE

[75] Inventors: Sharon B. Payton, Daniel L. Poland; both of Fremont, Mich.; Bobby W. Moore, Fletcher, N.C.; Jay A. Burnett; Twin Lake, Mich.; Jerry A. Stroven, White Cloud, Mich.

[73] Assignee: Gerber Products Company, Freemont, Mich.

[21] Appl. No.: 830,624

[22] Filed: Feb. 4, 1992

[51] Int. Cl.$^5$ ............................................. A23L 2/04
[52] U.S. Cl. ................................. 426/599; 426/615; 426/330.5
[58] Field of Search ...................... 426/599, 615, 330.5

[56] References Cited

U.S. PATENT DOCUMENTS

| | | | |
|---|---|---|---|
| 3,366,490 | 1/1968 | Wagner | 426/599 |
| 3,787,589 | 1/1974 | Stephens | 426/599 |
| 3,892,877 | 7/1975 | Wagner | 426/599 |
| 5,053,232 | 10/1991 | Balestrieri | 426/330.5 |
| 5,096,719 | 3/1992 | Gresch | 426/599 |

FOREIGN PATENT DOCUMENTS

| | | | |
|---|---|---|---|
| 0166127 | 1/1986 | European Pat. Off. | 426/599 |
| 028991 | 9/1988 | European Pat. Off. | 426/599 |
| 3329071 | 2/1984 | Fed. Rep. of Germany | 426/599 |
| 1-215265 | 8/1989 | Japan | 426/599 |
| 677145 | 1/1981 | U.S.S.R. | 426/599 |
| 1424786 | 9/1988 | U.S.S.R. | 426/599 |

OTHER PUBLICATIONS

Leavy 1984 The Vegetable Times Cookbook Collier Books New York pp. 59-63, 65, 66, 70.

*Primary Examiner*—Carolyn Paden
*Attorney, Agent, or Firm*—Price, Heneveld, Cooper, DeWitt & Litton

[57] ABSTRACT

The present invention relates to a product and a process for producing a fruit juice and vegetable puree beverage. The process comprises comminuting cooked vegetables to allow their passage through an 80 mesh screen (U.S. Standard). The vegetable puree is then combined with fruit juice and/or fruit juice concentrate and water in proportions to yield a fruit juice/vegetable puree product having a vegetable solids content of from about 1% to about 4% by weight of the product. The resulting puree and fruit juice combination is then thoroughly mixed and homogenized.

35 Claims, No Drawings

PROCESSING METHOD USING ENTIRE PEELED VEGETABLE IN A FRUIT JUICE/VEGETABLE PUREE BEVERAGE

BACKGROUND OF THE INVENTION

The present invention relates to a novel beverage and method for preparing same.

Fruits are often valuable sources of Vitamin C, an important vitamin people need for proper nutrition. While fruits are easy to eat because they usually require little or no preparation, many people obtain their recommended daily allotment (RDA) of Vitamin C by consuming juices made from Vitamin C rich fruits, like oranges. Because Vitamin C is a water soluble vitamin, much of it remains with the juice and not the pulp during processing. In addition, the water solubility of Vitamin C makes it easy to supplement the Vitamin C level of a fruit juice by the addition of sufficient ascorbic acid to meet the RDA. Fruit juices, because of their nutritional attributes, convenience and great taste have proven to be quite successful in the marketplace.

Another important vitamin which people need in their diet is Vitamin A. Vegetables are often a valuable dietary source of Vitamin A, or its biochemical precursor, beta-carotene. Unfortunately, many people do not receive their RDA of Vitamin A because they do not eat enough vegetables. One possible reason for this low consumption of vegetables is that, unlike fruits, vegetables usually require that the consumer take the time to prepare or cook the vegetable prior to eating. One possible remedy to this disadvantage is to remove the preparation step for the consumer and, like has been done for fruits, make a juice out of the vegetable. While a variety of vegetable juices are present on the market, i.e., carrot juice, celery juice, sauerkraut juice, and tomato juice, none, with the possible exception of V-8 JUICE, have been nearly as popular with the consuming public as fruit juices. While there may be a variety of reasons for this lack of success, the main reason is probably that vegetable juices are not nearly as palatable as fruit juices Therefore, because people generally do not drink vegetable juice, it is not a reasonable alternative to eating vegetables as a source of Vitamin A and the other nutritional attributes of vegetables.

Another disadvantage associated with vegetable juice, in addition to poor taste, is that in vegetables, the bulk of the vitamins remain with the pulp during processing (Vitamin A is not a water soluble vitamin like Vitamin C). While one might suggest that this disadvantage easily can be overcome by the inclusion of the pulp with the vegetable juice, vegetable pulp is even less palatable than vegetable juice. Given the already demonstrated low palatability and popularity of vegetable juices, there is little incentive to increase the vitamin content of a vegetable juice by the addition of vegetable pulp when that addition will diminish the palatability of the vegetable juice even more.

Therefore, there is a need to provide a product and a process by which the vitamins present in vegetable pulp can be incorporated into a beverage without significantly compromising the palatability of the beverage.

SUMMARY OF THE INVENTION

The present invention relates to a product and a process for producing a fruit juice and vegetable puree beverage. The process comprises comminuting cooked vegetables to a puree. The vegetable puree is then combined with fruit juice and/or fruit juice concentrate and water. The resulting puree and fruit juice combination is then thoroughly mixed to form a fruit juice/vegetable puree beverage.

DETAILED DESCRIPTION OF THE PREFERRED EMBODIMENT

In the preferred embodiment, the beverage compositions comprise fruit juice, vegetable puree, perhaps water, and ascorbic acid. The vegetable puree is comminuted to such an extent that the vegetable puree beverage will pass through an 80 mesh screen (U.S. Standard). The vegetable puree is combined with fruit juice and/or fruit juice concentrate and water in proportions to yield a fruit juice/vegetable puree product having a vegetable solids content of from about 1% to about 5%. The fruit juice solids content is typically from about 6% to about 17% by weight of the product. The vegetable solids content refers to the carbohydrate and cellulose contents of the vegetable puree, most of which is insoluble. The fruit juice solids content is primarily dissolved sugars. The beverage total solids content is the total of vegetable solids and juice solids. The resulting puree and fruit juice combination is then thoroughly mixed and homogenized to form a fruit juice/vegetable puree beverage having a total beverage solids content of from about 7% to about 18% by weight of the beverage.

The vegetable puree component of the beverage can be any type of vegetable puree. Examples include puree of carrot, sweet potato, yam, and squash, among other vegetables. The beverages herein typically contain from about 20% to about 30% vegetable puree, preferably about 25% vegetable puree where the puree has a vegetable solids content of from about 4–20%, preferably from about 8% to about 10% and most preferably 9%.

The fruit juice component of the beverage can be any type of reconstituted fruit juice, that is, juices which have been concentrated by evaporating a significant amount of their water content, and subsequently diluted to their usual strength through the addition of water. Examples include juice of orange, apple, pineapple, as well as other juices including pear, grapefruit, grape and apricot. Fresh fruit juices may comprise a portion of the fruit juice component of the beverage. Fresh fruit juices cannot, in the most preferred embodiment, comprise the total amount of the fruit juice component of the beverage, however, because the water added to cook the vegetables would dilute the fresh juice portion and force the reclassification of the description of the fruit portion of the beverage from a "fruit juice" to a "fruit drink." In the broader aspects of the invention, the fruit portion of the beverage could be a drink, thus allowing the use of 100% fresh juice as the fruit juice component of the beverage. Indeed in the broadest aspects of the invention, use of the term "fruit juice" is intended to encompass a fruit drink. The beverages herein typically contain from about 70% to about 80% fruit juice, preferably about 75% fruit juice.

The vegetable component of the beverage is processed to a puree by a series of progressively refining milling and finishing steps. The first step of the process involves the cooking of the vegetable. In order to maintain the product identity of the juice, the vegetable is cooked in a portion of the water required to reconstitute the fruit juice concentrate to single strength. Because it is desirable to retain the nutrients present in the vegetable, any cooking method where all the cooking water is retained with the vegetable is preferred. One possible method for this type of cooking is a screwsteamer with all of its ports closed. Another possible method utilizes the direct injection of steam into the product. This method also facilitates the production of a puree from the vegetable. Depending on the vegetable, a pass through an extructor to first break up the vegetable may be advisable prior to cooking.

Generally, the cooked vegetable is first pumped through a mill such as a Fitzmill, having a 0.031 inch classifying screen and then through a finisher having a 0.033 inch finishing screen to eliminate larger particles. Sometimes, the vegetable is first passed through broader screens such as a 3/16 inch Robinson Mill and a ⅛ inch finisher prior to processing through the 0.031 and 0.033 inch screens.

An important step in the processing of the vegetable is comminuting the vegetable solids even further, so they will pass through an 80 mesh screen (U.S. Standard). In the preferred embodiment, this further comminuting is accomplished by microcutting the milled vegetable puree in a microcutter such as the Comitrol Processor Model 1500 by Urschel Laboratories. The Model 1500 is equipped with a microcut head and corresponding impeller to produce the vegetable puree. It has 212 blades operating at 9540 rpm. In the operation of the Model 1500, the vegetables are fed to the center of a high speed rotating impeller. Centrifugal force moves the product outward to the impeller tips, which carry the product past the cutting edges of the microcut head.

Either before or after the microcutting step, the solids content of the vegetable puree is determined. After microcutting, the puree is most preferably combined with sufficient juice concentrate, water and optionally some fresh juice to yield an end product having the equivalent of 25% of a vegetable puree with a vegetable solids content of 4% to 20%, preferably 8% to 10% and most preferably 9% by weight, and 75% of a single strength juice. The fruit juice solids content will vary depending on the fruit source used, but as noted above will range from 6% to 17% by weight, most typically in the 8% to 14% range by weight.

After the microcutting of the vegetables into a fine puree, the next important step in the process is mixing the vegetable puree into the fruit juice carrier. In the preferred embodiment, a high speed, high shear mixer is employed. The preferred mixer is the Cherry Burrell rapid mixer. This mixer includes bottom blades operating at 1800–2000 rpm in a square container such that a violent, high shear mixing action is achieved. The rapid mixer is designed to dissolve/disperse solids or semi-solids in solution quickly and thoroughly.

Homogenization is important in the preferred embodiment to give the beverage stability, i.e., to prevent separation of undissolved vegetable puree material. The mixed vegetable puree and fruit juice is passed through a homogenizer at a pressure of 5500 psi and a rate of 2400 gallons/hour. It is then pasteurized by being passed through a plate heat exchanger at 200° F. for one minute. The beverage is then deaerated to cool and eliminate residual air prior to filling.

The advantage of this incorporation of vegetable puree into the fruit juice is that the resulting beverage contains the Vitamin A and other nutritional attributes of the vegetable in a highly palatable delivery vehicle. To maintain that high level of palatability, it has been found that the beverage should contain from about 70% to about 80% fruit juice, preferably about 75% fruit juice and from about 20% to about 30% vegetable puree, preferably about 25% vegetable puree at 9% vegetable solids. Table 1 illustrates the results of a 20 member panel evaluation of the sensory attributes of five different carrot puree/apple juice beverage formulations. Primary sensation=(1°) and secondary sensation=(2°).

TABLE 1

| CARROT/% APPLE | 25/75 | 30/70 | 35/65 | 20/80 | 33/67 |
|---|---|---|---|---|---|
| 1° AROMA | apple | apple | carrot | apple | carrot |
| 2° AROMA | | carrot | apple | | apple |
| 1° APPEARANCE | glossy | glossy | glossy | glossy | glossy |
| 2° APPEARANCE | has pulp | has pulp | has pulp | has pulp | has pulp |
| COLOR | orange | orange | orange | light orange | orange |
| TEXTURE | juice-like | juice-like | heavy mouth-feel | heavy mouth-feel | heavy mouth-feel |
| 1° FLAVOR | apple | carrot | carrot | apple | carrot |
| 2° FLAVOR | carrot | slight sweet | slight sweet | sweet | apple |

The following specific examples, which illustrate the processing steps necessary to produce the beverage of the present invention, are directed to several embodiments of the present invention and are not to be construed as limiting the scope of the invention.

Throughout the Specification and the Examples, percentages are based on weight unless indicated otherwise.

EXAMPLE 1

ORANGE JUICE/CARROT PUREE BEVERAGE

This formulation is designed to give a blend of single strength juice with vegetable puree in the following ratio: 75% orange juice from concentrate (11.8° Brix minimum) and 25% carrot puree at 9% vegetable solids.

| I. INGREDIENTS | WEIGHT (POUNDS) |
|---|---|
| Carrots, diced (frozen) (9% vegetable solids) OR | 250 |
| Carrots, fresh (9% vegetable solids) | 250 |
| Orange juice concentrate (frozen) (57° Brix) | 155 |
| Vitamin C | 0.90 |
| Citric acid to adjust pH within the range of about 3.8 to 4.1 | |

II. BATCHING

A. Carrots, Frozen

The carrots were passed through an extructor to break them down into smaller pieces. They are then instantaneously heated via direct injection of steam at 210° F. to 220° F. as they are pumped to a slurry tank. In the slurry tank, they are heated to a core temperature of 180° F. The resulting initial carrot puree is then conveyed to the rough mill for further processing.

B. Carrots, Fresh

The carrots were steam peeled and then cooked in a screwsteamer with all ports closed for 15 to 20 minutes at 205° F.

C. Orange Juice Concentrate

The orange juice concentrate was weighed and then pumped into a rapid mixer tank. The weight of the concentrate used varies to reflect the Brix value of the material. The Vitamin C was then added.

III. PROCESSING AND MIXING

A. Carrots-Rough Processing

After cooking, the carrots were milled in a Fitzmill until the carrots could pass through at least a 0.031 inch classifying screen. The carrots were then finished until they could pass through at least a 0.033 inch finishing screen. The resulting carrot puree was then stored in a tank. When fresh carrots were used, it was desirable to process the carrots with a Robinson Mill having a 3/16 inch sieve screen and then through a finisher having a ⅛ inch finishing screen prior to processing with the 0.031 inch Fitzmill and the 0.033 finisher.

B. Carrots—Fine Processing

The carrot puree was then heated to a final temperature of from about 170° F. to about 190° F., and preferably to 180° F. and the total solids content of the puree was checked. The puree was then passed through an Urschel Mill having a 212 blade microcut head rotating at 9540 rpm.

C. Mixing

The carrot puree, the orange juice concentrate and water are then combined in proportions to yield a final product with the equivalent of 25% vegetable puree at 9% solids content and 75% single strength fruit juice. The mixture was then mixed in the rapid mixer for at least five minutes at 1800 to 2000 rpm. After mixing, the Vitamin C, Brix and pH were measured and adjusted as required to meet product specifications, the most preferred product having a pH of 3.8 to 4.1, a Brix of 6° to 14°, a total beverage solids content of 8% to 16%, and a Vitamin C content of 85 mg per 100 grams. For the specific product of this example, the desired Brix is 8.78° to 11.08° and the total beverage solids are 9.33%–11.6%. The mixture was then homogenized at 5500 psi at 2400 gallons/hour and passed through a plate heat exchanger to pasteurize at 200° F. for one minute. It was then deaerated to cool and eliminate residual air prior to filling.

EXAMPLE 2

PINEAPPLE JUICE/CARROT PUREE BEVERAGE

This formulation is designed to give a blend of single strength juice with vegetable puree in the following ratio: 75% pineapple juice from concentrate (12.8° Brix minimum) and 25% carrot puree at 9% vegetable solids. The final product specifications call for a pH of 3.8–4.1, 9.57°–11.98° Brix, total beverage solids of 10.43% to 12.73% and Vitamin C of 85 mg/100 grams.

| I. INGREDIENTS | WEIGHT (POUNDS) |
| --- | --- |
| Carrots, diced (frozen) (9% vegetable solids) OR | 250 |
| Carrots, fresh (9% vegetable solids) | 250 |
| Pineapple juice concentrate (60.5° Brix) | 158.47 |
| Vitamin C | 0.90 |
| Citric acid to adjust pH to 3.8 to 4.1 | |

II. BATCHING

The same procedure as shown in Example 1 was followed, just replacing pineapple for orange in formulation.

III. PROCESSING AND MIXING

The same procedure as shown in Example 1 was followed, just replacing pineapple for orange in formulation.

EXAMPLE 3

APPLE JUICE/CARROT PUREE BEVERAGE

This formulation is designed to give a blend of single strength juice with vegetable puree in the following ratio: 75% apple juice from concentrate (11° Brix minimum) and 25% carrot puree at 9% vegetable solids. The final product specification calls for a pH of 3.8–4.1, 8.78°–11.08° Brix, total beverage solids of 9.33%–11.63% and Vitamin C of 85 mg/100 grams.

| I. INGREDIENTS | WEIGHT (POUNDS) |
| --- | --- |
| Carrots, diced (frozen) (9% vegetable solids) OR | 250 |
| Carrots, fresh (9% vegetable solids) | 250 |
| Apple juice concentrate (70° Brix) | 117.70 |
| Vitamin C | 0.90 |
| Citric acid to adjust pH to 3.8 to 4.1 | |

II. BATCHING

The same procedure as shown in Example 1 was followed, just replacing apple for orange in formulation.

III. PROCESSING AND MIXING

The same procedure as shown in Example 1 was followed, just replacing apple for orange in formulation.

EXAMPLE 4

APPLE JUICE/SWEET POTATO PUREE BEVERAGE

This formulation is designed to give a blend of single strength juice with vegetable puree in the following ratio: 75% apple juice from concentrate (11° Brix minimum) and 25% sweet potato puree at 16% vegetable solids. The final product specifications call for a pH of 3.8–4.1, 9.98°–12.28° Brix, a total beverage solids content of 11.04%–13.34% and a Vitamin C content of 85 mg/100 grams.

| I. INGREDIENTS | WEIGHT (POUNDS) |
| --- | --- |
| Sweet Potatoes (16°–20° Brix) (16%–19% vegetable solids) | 250 |
| Apple juice concentrate (70° Brix) | 117.70 |
| Vitamin C | 0.90 |
| Citric acid to adjust pH 3.8–4.1 | |

II. BATCHING

A. Sweet Potatoes

Sweet potatoes at 16°–20° Brix were steam peeled at 190° F. to 200° F. (approximately 90 to 150 seconds steaming time) in a 7–10% lye bath. The sweet potatoes were then scrubbed by a Magnuson Maguscrubber at its lowest setting. The potatoes were then cooked in a screwsteamer with all ports closed for 35 to 50 minutes at 207° F. depending on the size of the potatoes (if large, 35–40 minutes; if small, 40–50 minutes). The vegetable solids following cooking were 16% to 19% and the Brix was 16° to 18°. The potatoes were then pumped through a 3/16 inch Robinson Mill and then passed through a finisher having a 0.040 inch finishing screen and pumped to a precook tank.

B. Apple juice concentrate

The apple juice concentrate was weighed and then pumped into a rapid mixer tank. The weight of the concentrate used varies to reflect the Brix value of the material. The Vitamin C was then added.

III. PROCESSING AND MIXING

The same procedure as shown in Example 1 was followed, replacing the sweet potatoes for carrots and apple juice for orange juice. If the sweet potatoes did not initially have at least 16° Brix, the batching and rough processing steps were modified in conventional ways to bring the Brix to 16°–20°.

C. Mixing

The mixing was done in the same manner as in Example 1.

The apple/carrot, orange/carrot, pineapple/carrot and apple/sweet potato beverages discussed in the examples above all provided at least 40% of tee RDA for Vitamin A and 120% of the RDA for Vitamin C. The Vitamin A level was achieved on the basis of the incorporated vegetable while the Vitamin C level was achieved by fortification of the beverage with ascorbic acid.

The foregoing detailed description is given for clearness of understanding only, and no unnecessary limitations should be understood therefrom, as modifications within the scope of the invention will be apparent to those skilled in the art.

What is claimed is:

1. A process for producing a fruit juice and vegetable puree beverage comprising:
   cooking a vegetable, selected from carrot, sweet potato, yam, squash and mixtures thereof;
   comminuting said cooked vegetable to form a puree;
   mixing said vegetable puree with a fruit juice concentrate, selected from orange, apple, pineapple, pear, grapefruit, grape, apricot and mixtures thereof and sufficient additional water to reconstitute said fruit juice concentrate and to form a fruit juice/vegetable puree beverage.

2. A process in accordance with claim 1 wherein said mixing step includes homogenizing said vegetable puree and fruit juice combination.

3. A process in accordance with claim 2 wherein said vegetables are comminuted sufficiently to allow their passage through an 80 mesh screen (U.S. Standard).

4. A process in accordance with claim 3 wherein said vegetable puree and said fruit juice concentrate are mixed in proportions to yield a fruit juice/vegetable puree product having a vegetable solids content of from about 1% to about 5% by weight of the product.

5. A process in accordance with claim 4 wherein said comminuting step includes the step of microcutting said vegetable.

6. A process in accordance with claim 5 further comprising the step of heating the vegetable to a temperature of from about 170° F. to about 190° F. prior to said microcutting step.

7. A process in accordance with claim 6 wherein said microcutting step comprises operating a 212 blade microcut head at 9540 rpm to form the vegetable puree.

8. A process in accordance with claim 5 wherein said comminuting step includes the step of pumping said vegetable through a mill having a 0.031 inch classifying screen and then passing said vegetable through a finisher having a 0.033 inch finishing screen, prior to said microcutting step.

9. A process in accordance with claim 2 wherein said mixing step includes mixing with a high speed, high shear mixer.

10. A process in accordance with claim 9 wherein said mixer employs bottom blades operating at from about 1800 rpm to about 2000 rpm.

11. A process in accordance with claim 10 wherein said mixing step comprises mixing the fruit juice and vegetable puree for at least five minutes.

12. A process in accordance with claim 11 wherein said mixing step comprises the step of homogenizing the fruit juice-vegetable puree mixture at 5500 pounds per square inch at 2400 gallons/hour.

13. A process in accordance with claim 1 wherein said vegetable solids content of the beverage is from about 2% to about 3% by weight.

14. A process in accordance with claim 1 wherein said fruit juice is provided as a fruit juice concentrate and water, said vegetable puree, said fruit juice concentrate and said water being combined in proportions to yield the equivalent from about 20% to 30% by weight of a vegetable puree having a vegetable solids content of from about 4% to about 20% and from about 70% to 80% by weight of a single strength juice.

15. A process in accordance with claim 14 wherein said vegetable puree, said fruit juice concentrate and water are mixed in proportions to yield the equivalent of from about 20% to 30% by weight vegetable puree at a vegetable solids content of from about 8% to about 10% by weight and from about 70% to 80% by weight of a single strength juice.

16. A process in accordance with claim 15 wherein said fruit juice is provided by providing both fruit juice concentrate and water, and fresh fruit juice.

17. A process in accordance with claim 15 wherein said mixing step includes homogenizing said vegetable puree and fruit juice combination.

18. A process in accordance with claim 17 wherein said vegetables are comminuted sufficiently to allow their passage through an 80 mesh screen (U.S. Standard).

19. A process in accordance with claim 15 wherein said comminuting step includes the step of microcutting said vegetable.

20. A process in accordance with claim 19 wherein said comminuting step includes the step of pumping said vegetable through a mill having a 0.031 inch classifying screen and then passing said vegetable through a finisher having a 0.033 inch finishing screen, prior to said microcutting step.

21. A process in accordance with claim 1 wherein said vegetables are comminuted sufficiently to allow their passage through an 80 mesh screen (U.S. Standard).

22. A process in accordance with claim 21 wherein said vegetable puree and said fruit juice concentrate are mixed in proportions to yield a fruit juice/vegetable puree product having a vegetable solids content of from about 1% to about 5 by weight of the product.

23. A process in accordance with claim 22 wherein said vegetable solids content of the beverage is from about 2% to about 3% by weight.

24. A process in accordance with claim 1 wherein said vegetable puree and said fruit juice concentrate are mixed in proportions to yield a fruit juice/vegetable puree product having a vegetable solids content of from about 1% to about 5% by weight of the product.

25. The process of claim 1 in which said cooked vegetable puree is comminuted sufficiently fine to pass through an 80 mesh screen (U.S. standard) and is homogenized with said fruit juice to yield a beverage having a vegetable solids content of from about 1 to about 5% by weight of the product and a fruit juice solids content of from about 6 to about 17% by weight of the product.

26. A fruit juice and vegetable puree beverage comprising:
a cooked vegetable puree, selected from carrot, sweet potato, yam, squash and mixtures thereof, mixed with a fruit juice, selected from orange, apple, pineapple, pear, grapefruit, grape, apricot and mixtures thereof.

27. The beverage of claim 26 in which said vegetable puree and fruit juice blend are homogenized.

28. The beverage of claim 27 in which said vegetable puree is comminuted sufficiently fine to pass through an 80 mesh screen (U.S. Standard).

29. The beverage of claim 28 which includes from about 1% to about 5% by weight of vegetable solids.

30. The beverage of claim 29 in which said vegetable solids content is from about 2% to about 3% by weight.

31. The beverage of claim 28 which comprises:
from about 20% to about 30% by weight of said cooked vegetable puree at a vegetable solids content of from about 4% to about 20% by weight, and from about 70% to about 80% by weight of a single strength fruit juice.

32. The beverage of claim 31 in which said vegetable puree component has a vegetable solids content of from about 8% to about 10% by weight.

33. The beverage of claim 26 which comprises:
from about 20% to about 30% by weight of said cooked vegetable puree at a vegetable solids content of from about 4% to about 20% by weight, and from about 70% to about 80% by weight of a single strength fruit juice.

34. The beverage of claim 33 in which said vegetable puree component has a vegetable solids content of from about 8% to about 10% by weight.

35. The fruit juice and vegetable puree beverage of claim 26 comprising:
said cooked vegetable puree being comminuted sufficiently fine to pass through an 80 mesh screen (U.S. standard) and being homogenized with said fruit juice to yield a beverage having a vegetable solids content of from about 1 to about 5% by weight of the product and a fruit juice solids content of from about 6 to about 17% by weight of the product.

* * * * *

UNITED STATES PATENT AND TRADEMARK OFFICE
CERTIFICATE OF CORRECTION

PATENT NO. : 5,248,515
DATED : September 28, 1993
INVENTOR(S) : Sharon B. Payton et al.

It is certified that error appears in the above-indentified patent and that said Letters Patent is hereby corrected as shown below:

column 7, line 37: "tee RDA" should be --the RDA--;

column 9, line 11: "5" should be --5%--.

Signed and Sealed this

Twelfth Day of July, 1994

Attest:

BRUCE LEHMAN

Attesting Officer

Commissioner of Patents and Trademarks